(12) United States Patent
Furuichi et al.

(10) Patent No.: US 8,448,197 B2
(45) Date of Patent: May 21, 2013

(54) OPTICAL PICKUP DEVICE WITH PROTRUSIONS IN A LASER BEAM DIRECTION TO SHIELD ULTRAVIOLET LIGHT AND METHOD FOR MANUFACTURING THE SAME

(75) Inventors: Hiroaki Furuichi, Kawasaki (JP);
Kazumi Takahashi, Toyokawa (JP);
Hiroyasu Yoshida, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 753 days.

(21) Appl. No.: 12/624,529

(22) Filed: Nov. 24, 2009

(65) Prior Publication Data
US 2010/0162281 A1   Jun. 24, 2010

(30) Foreign Application Priority Data
Dec. 19, 2008   (JP) .................................. 2008-323105

(51) Int. Cl.
*G11B 7/22*   (2006.01)
(52) U.S. Cl.
USPC ........................................................ 720/672

(58) Field of Classification Search
USPC .......... 257/E21.499–E21.501; 369/43–44.12, 369/116, 121–123; 438/24–26; 720/600, 720/658, 671, 672
See application file for complete search history.

(56) References Cited

U.S. PATENT DOCUMENTS

| | | | |
|---|---|---|---|
| 2003/0031116 A1* | 2/2003 | Takeda et al. | 369/283 |
| 2009/0055851 A1* | 2/2009 | Tanaka et al. | 720/695 |

FOREIGN PATENT DOCUMENTS

| | | |
|---|---|---|
| JP | 2002-251776 A | 9/2002 |
| JP | 2004-10759 A | 1/2004 |
| JP | 2005-32314 A | 2/2005 |
| WO | 2006/118037 A1 | 11/2006 |

* cited by examiner

*Primary Examiner* — Nathan Danielsen
(74) *Attorney, Agent, or Firm* — Mattingly & Malur, PC

(57) ABSTRACT

To provide an optical pickup device adapted such that for adhesion fixing of a holder for holding an LD or a light-receiving element to an optical pickup casing via an ultraviolet-curable adhesive, curing shrinkage during ultraviolet irradiation can be reduced and adhesion fixing achieved with high positioning accuracy. In a structure for adhesion fixing of a holder for holding an LD or a light-receiving element to an optical pickup casing via an ultraviolet-curable adhesive, since protrusions are provided at peripheral sections (UV irradiation light source side) on a bonding surface of the holder, a section exposed to strong UV light is first cured, then after the adhesive has moved from an uncured section, the amount of shrinkage of the first cured section in a Z-direction is reduced, and the uncured section is cured.

12 Claims, 4 Drawing Sheets

FIG. 3

1) AN LD 31 IS FIXED TO A HOLDER 41 USING A THERMOSETTING ADHESIVE OR THE LIKE

2) AN LD MODULE 3 IS ALIGNED BY USE OF POSITIONING CHUCKS 61a AND 61b SO THAT AN OPTICAL CLEARANCE 210 RELATIVE TO THE MODULE, X-Y IN-PLANE ORIENTATION, AND AN ANGLE OF INCLINATION ARE OPTIMIZED WITH RESPECT TO AN OPTICAL ALIGNING HOLE 20 IN AN OPTICAL PICKUP CASING 2

3) A PREDETERMINED AMOUNT OF EACH OF ULTRAVIOLET CURABLE ADHESIVES 100a AND 100b IS APPLIED TO CORRESPONDING ONE OF TWO PLACES ON AN ADHESIVE SURFACE 21 OF THE CASING 2

4) THE ADHESIVES 100a AND 100b ARE CURED BY UV IRRADIATION

5) THE POSITIONING CHUCKS 61a, 61b ARE RELEASED

FIG. 4

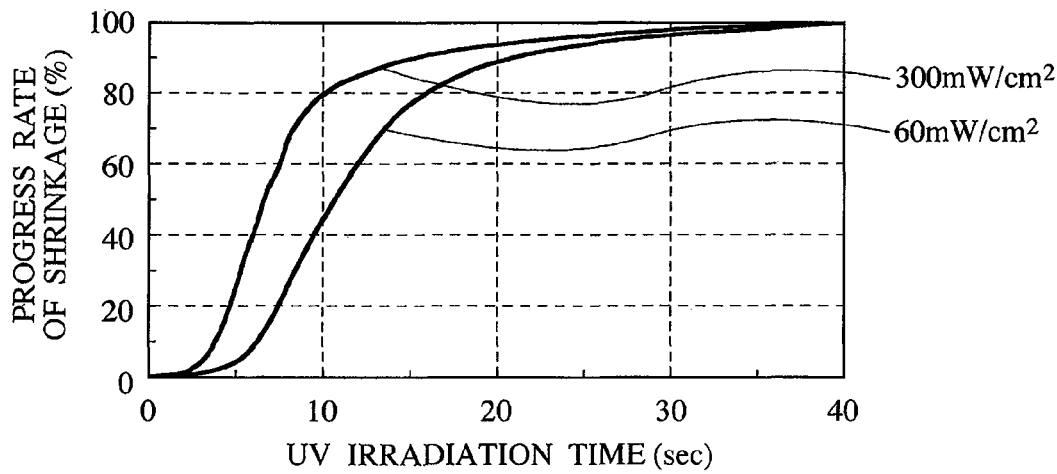

OPTICAL PICKUP DEVICE WITH PROTRUSIONS IN A LASER BEAM DIRECTION TO SHIELD ULTRAVIOLET LIGHT AND METHOD FOR MANUFACTURING THE SAME

BACKGROUND OF THE INVENTION

1. Field of the Invention

The present invention relates generally to optical pickup devices used for recording and reproducing information on and from optical discs such as compact discs (CDs), digital versatile discs (DVDs), or Blu-ray discs (BDs), or to optical disc drive units with a built-in optical pickup device. More particularly, the invention is directed to a technique for adhesion fixing of laser diodes, light-receiving elements, and the like.

2. Description of the Related Art

The optical pickup devices used to record and reproduce information on and from optical discs, or optical disc drive units with such a built-in optical pickup device, usually include two kinds of optical systems. One kind of optical system guides the light that has been emitted from a laser diode (LD), to an objective lens via various lenses, prisms, reflecting mirrors, and other optical elements, and converging the light upon an optical disc. The other kind of optical system converts the light that has been reflected from the optical disc, into image form on the surface of the light-receiving element via the objective lenses, the prisms, the reflecting mirrors, various lenses, and the like. Of these optical elements, at least the LD and the light-receiving element need fixing after being adjusted to an optically optimal position relative to a casing of the optical pickup device. For this reason, the LD and the light-receiving element are usually constructed so that both are temporarily bonded onto respective holders suitably shaped for bonding onto a casing, then the holders and the casing are each adjusted to an optically optimal position, and the holders are fixed to an optimal three-dimensional position on the casing by utilizing the thickness of an adhesive agent layer formed using an ultraviolet (UV) curable adhesive.

In this case, the clearance between the casing and the holder to which the LD or the light-receiving element is fixed, that is, the thickness of the adhesive layer is often maximized to about 1 mm due to characteristics of optical components and any nonuniformities in machining tolerance and assembly position between optical components. This may cause nonnegligible curing shrinkage of the adhesive itself during UV irradiation, resulting in significant optical misalignment. Avoiding this problem requires an adhesion-fixing technique that allows any shifts in position due to the shrinkage of the adhesive itself to be suppressed, even if the bonding clearance between the holder and the casing is large.

JP-A-2005-32314, for example, discloses the features of a technique that even when a laser light-emitting element or a light-receiving element is to be fixed with a clearance relative to a frame, using an adhesive mixed with inorganic compound powder for letting UV radiation through makes it possible to suppress any shifts in position by suppressing fluidic deformation during curing, as well as to apply a necessary amount of UV irradiation.

JP-A-2004-10759 discloses a structure in which either a first member or a second member has protrusions, with the other having connections disposed adjacently to these protrusions to render positions of each protrusion adjustable in a height direction thereof. In this structure, the first member and the second member can be adhesion-fixed via a desired clearance by applying a thin coat of adhesive to a region from the protrusion to the adjacent connection and then curing the adhesive.

JP-A-2002-251776 discloses a structure in which a mounting plate for a photodetector is notched inward from both ends of the plate to prevent emitted UV radiation from easily forming a blind region that cures the adhesive. In addition, surfaces onto which the notches are to be bonded in the structure are each grooved in parallel to a surface direction of the mounting plate, such that a direction in which the adhesive is likely to shift in position is set to match a direction of the grooves.

BRIEF DESCRIPTION OF THE DRAWINGS

FIG. 3 is an illustrative diagram of an assembly sequence in the first embodiment of the present invention;

FIG. 4 is a diagram that illustrates curing progress rates versus a UV irradiation time, in the present invention;

SUMMARY OF THE INVENTION

In the conventional technique of JP-A-2005-32314, although using the adhesive mixed with inorganic compound powder for letting UV radiation through ensures the necessary UV irradiation level and the curing shifts in the position of the adhesive itself suppressible, no description is given of any special measures or actions concerning the method of UV irradiation during UV curing. In JP-A-2004-10759, while forming a protrusion at each ends of the main unit is likely to be advantageous in terms of bonding strength, no description is given of any special measures or actions concerning the method of UV irradiation during UV curing. The structure disclosed in JP-A-2002-251776 is likely to create a uniform curing state of the adhesive by suppressing the occurrence of the emitted UV radiation's blind region that cures the adhesive.

As discussed above, as far as UV irradiation is concerned, the above conventional techniques only emphasizes ensuring the necessary UV irradiation level and completely curing the adhesive; none of the three Patent Documents describe a method of using actively the distribution of UV irradiation strength.

Accordingly, an object of the present invention is to provide an optical pickup device having an adhesion-fixing structure capable of forming and actively using a UV irradiation strength distribution to reduce any impacts of optical misalignment due to UV curing shrinkage of an adhesive.

In order to attain the above object, in the present invention, for adhesion fixing a holder for holding an LD or a light-receiving element to an optical pickup casing via an ultraviolet-curable adhesive and, protrusions are provided at peripheral sections on a bonding surface of the holder for holding the LD or the light-receiving element, and then the adhesive is put in a clearance between the bonding surface of the holder and that of the optical pickup casing so that the adhesive does not come into contact with the protrusions. After this, the adhesive is cured with ultraviolet radiation to fix the holding to the casing. Thus, during ultraviolet irradiation, curing shrinkage is absorbed at sections reduced in irradiation strength by the protrusions, and the absorption lessens a total shrinkage level of the adhesive, hence allowing adhesion fixing with high positioning accuracy.

As outlined above, according to the present invention, optical misalignment of an optical pickup can be reduced and a yield rate in an assembly process can be improved. A high-performance and/or thin-walled optical pickup device tightened in stringent assembly accuracy specifications can also be manufactured.

DESCRIPTION OF THE PREFERRED EMBODIMENTS

First Embodiment

First, a first embodiment of the present invention will be described.

Figure 1:
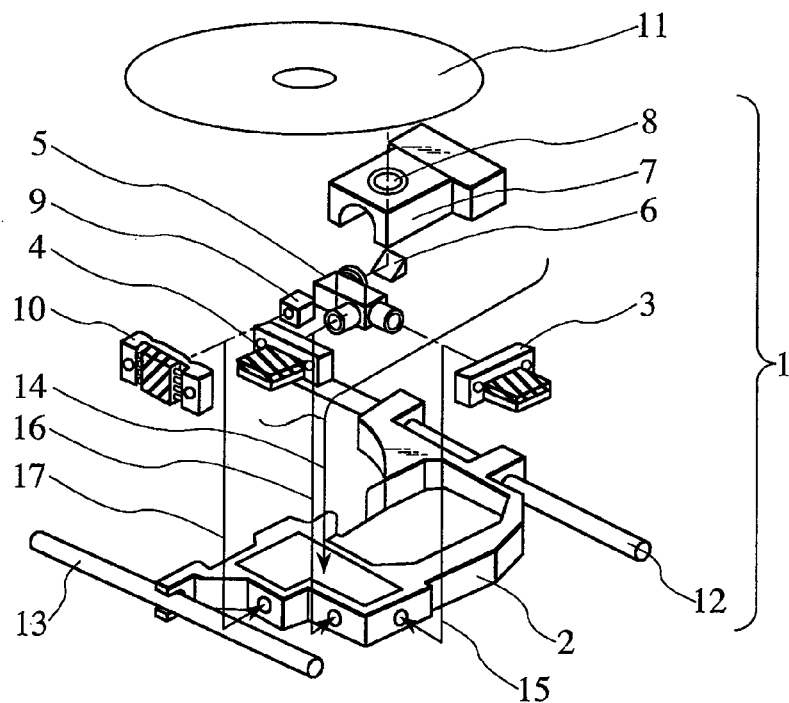
FIG. 1 is a developed perspective view that illustrates an optical pickup device applying a first embodiment of the present invention.
Figure 2:
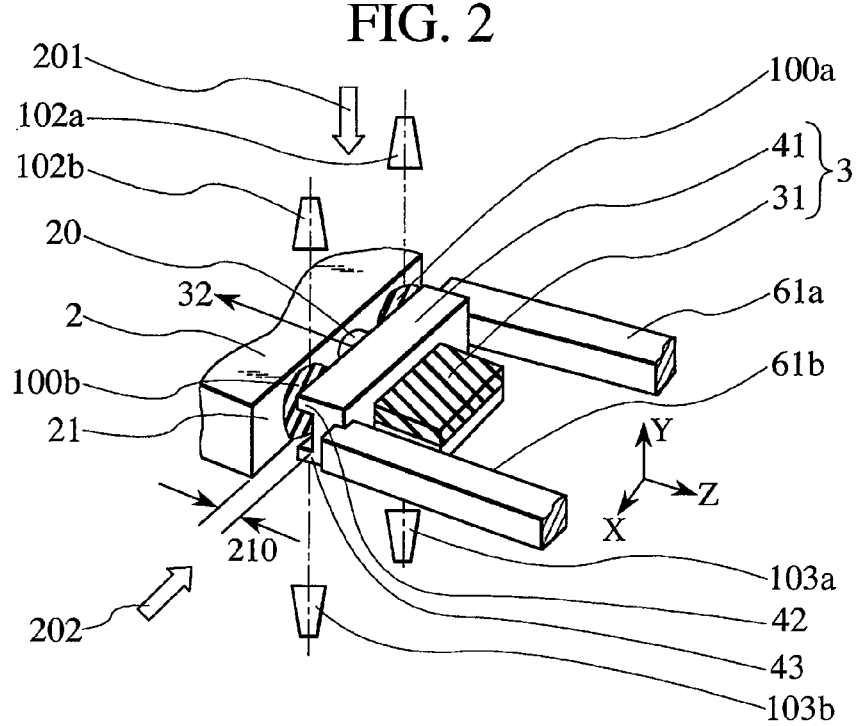
FIG. 2 is a perspective view illustrating an assembly status of an LD module in the first embodiment of the present invention.

FIG. 1 is a developed perspective view that illustrates constituent elements of, and an assembly method for, an optical pickup device 1 to which the first embodiment of the invention is applied. FIG. 2 is a perspective view illustrating an assembly status of the optical pickup device 1 in which an LD module 3 in FIG. 1 is installed. FIG. 3 is an illustrative diagram of an assembly sequence of the optical pickup device in FIG. 2. As shown in FIG. 1, the optical pickup device 1 of the present embodiment includes an optical pickup casing 2, the above-mentioned LD module 3, an LD module 4, a prism 5, a reflecting mirror 6, an actuator 7, an objective lens 8, a lens 9, and a light-receiving element module 10.

In the optical pickup device 1 of the above configuration, exit light from the LD module 3 or 4 is synthesized or reflected by the prism 5, then the light is guided via the reflecting mirror 6 to the objective lens 8 disposed on the actuator 7, and a spot is converged upon an optical disc 11. Light that has been reflected by the optical disc 11 forms an image on the light-receiving element 10 via the objective lens 8, the reflecting mirror 6, the prism 5, and the lens 9.

In order to realize the above optical system, internal components such as the actuator 7, reflecting mirror 6, prism 5, and lens 9, are mounted in an assembly direction 14 with respect to the optical pickup casing 2, and after this, the LD module 3, the LD module 4, and the light-receiving element module 10 are positionally adjusted in assembly directions 15, 16, and 17, respectively, prior to adhesion fixing. The optical pickup device 1 itself is constructed to make optical signal reading/writing possible by moving in a radial direction of a spinning optical disc by actions of a main shaft 12 and a subsidiary shaft 13.

An assembly sequence for major sections of the present invention is set forth using the LD module 3 (FIGS. 2 and 3). Since the LD modules 3, 4 and the light-receiving element module 10 are the same bonded structure, the invention can be applied to the light-receiving element module 10 similarly to the LD modules 3 and 4.

(1) The LD module 3 has its LD 31 fixed to the holder 41 via a thermosetting adhesive or the like in a prior process to facilitate bonding onto the optical pickup casing 2.

(2) The LD module 3 is gripped by positioning chucks 61a and 61b whose positions and angles can be three-dimensionally adjusted with respect to a casing optical aligning hole 20 in the optical pickup casing 2 fixed using an adjusting jig (not shown). Under this state, while laser light 32 is being emitted from the LD 31 (an electric power supply method is not shown), the optical pickup casing 2 and the LD module 3 are aligned with each other to optimize a Z-axial optical clearance 210 between the casing 2 and the module 3, X-Y in-plane orientation, and an angle of inclination.

(3) After the alignment, the clearance 210 between the optical pickup casing 2 and the LD module 3 is provided, then each of predetermined amount of ultraviolet curable adhesives 100a and 100b are applied to corresponding one of two places on a bonding surface 21 of the optical pickup casing 2, and the clearance 210 is returned to its initial state existing before the alignment has been completed. Each of the adhesives 100a and 100b provides bridging between the bonding surface 21 of the optical pickup casing 2 and a mating face of the holder 41.

(4) After this, Y-axially downward beams of UV light, 102a and 102b, and Y-axially upward beams of UV light, 103a and 103b, are emitted to cure the adhesives 100a and 100b.

(5) Finally, the positioning chucks 61a and 61b are released to complete the bonding procedure.

Figure 5A:
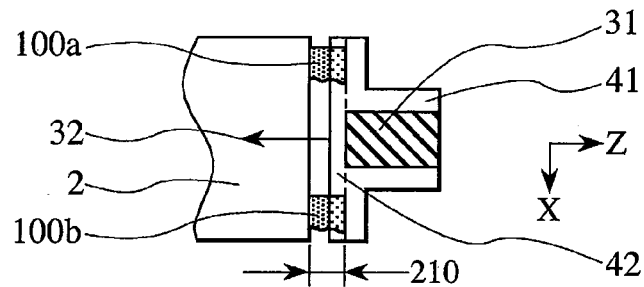
FIGS. 5A to 5D are explanatory diagrams illustrating a major section of the first embodiment of the present invention.
Figure 5B:
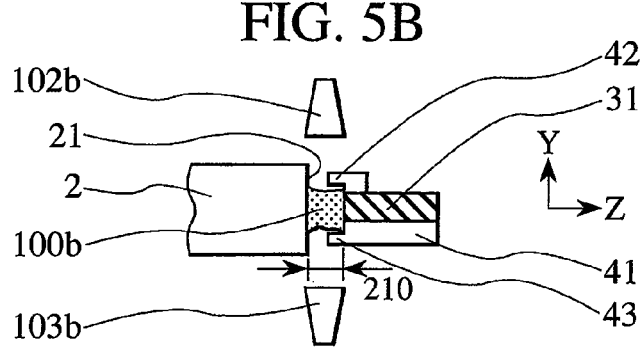
Figure 5C:
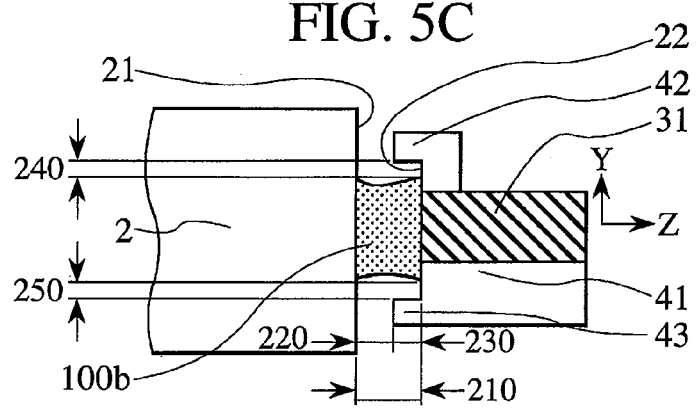
Figure 5D:
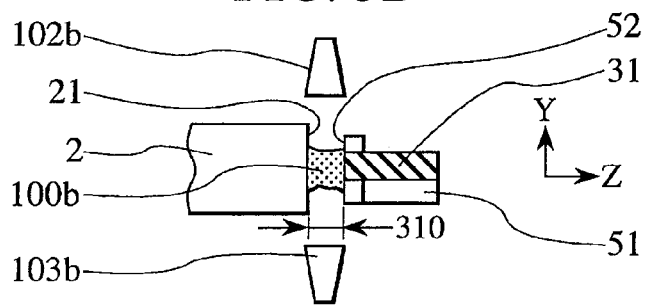

Additionally, a UV irradiation curing behavior is described below using FIGS. 5A to 5D. FIG. 5A is a plan view of the bonded region as viewed from a Y-axial viewing direction 201 in FIG. 2. FIGS. 5B, 5C, and 5D are side views of the bonded region as viewed from an X-axial viewing direction 202 in FIG. 2.

First, as shown in FIG. 5D, the UV irradiation curing behavior is described below for a case in which a holder 51 with a planar bonding surface 52 is traditionally and most commonly used in a conventional example. Simultaneous emission of the Y-axially downward beam 102a (not shown in FIG. 5D), 102b, and the Y-axially upward beam 103a (not shown in FIG. 5D), 103b, starts the curing of the adhesive 100a (not shown in FIG. 5D) and 100b, from the surface thereof. Therefore, a liquid portion remains centrally in each of the adhesives 100a and 100b, but since the surface is cured, curing shrinkage (volumetric shrinkage) of the adhesive itself cannot be absorbed and a Z-axial clearance 310 shrinks. A clearance 310 of about 0.5 mm, for example, causes 0.01-mm Z-axial shrinkage equivalent to about 2% of the clearance. Each of the adhesives 100a and 100b in corresponding one of two X-axial places has an imbalance due to variations in coating position or quantity, so during Z-axial shrinkage, shifts in position are also prone to occur in both X- and Y-directions. In addition, during Z-axial shrinkage, since a curing shrinkage force of an order of N (100 gf) occurs, the positioning chucks 61a and 61b gripping the holder 51, and a positioning mechanism (not shown) supporting the holder suffer deformation on an order of micrometers. In a particular structure of the chuck and that of the positioning mechanism, such deformation causes X-axial and Y-axial shifts in position. Since these diverse factors cause shifts in position, reduction in the amount of shrinkage (i.e., shrinkage force) during UV irradiation is required for reduction of the X-axial and Y-axial shifts in position.

A behavior during UV irradiation in the first embodiment of the present invention, in contrast to the above conventional example, is next described below using FIGS. 5A, 5B and 5C. The holder 41 has protrusions 42 and 43 at a UV irradiation light source side of the bonding surface 22, and the protrusions function to partially weaken the beams of UV light, 102b and 103b, against the adhesives applied between the bonding surface 21 of the optical pickup casing 2 and the bonding surface 22 of the holder 41. A clearance 220 for the adhesive 100b is exposed directly to the UV beams 102b and 103b.

The UV beams 102b and 103b are usually emitted using an optical-fiber bundle, not a spot light source. Light sources using an optical-fiber bundle have an area and a spread of an irradiation angle as well. In addition, because of scattered light being caused by reflection from the protrusions 42, 43, and the like, a clearance 230 for the adhesive 100b, the clearance being formed internally to the protrusions 42 and 43, does not have any light completely shielded and is irradiated with weak UV light.

Changes in a curing progress rate, or curing shrinkage rate, of an adhesive according to particular strength of UV irradiation light are described below using FIG. 4. FIG. 4 represents the curing progress rates versus a UV irradiation time, observed when a UV curable adhesive is irradiated with 300 mW/cm$^2$ of strong UV light and when the adhesive is irradiated with 60 mW/cm$^2$ of weak UV light. FIG. 4 indicates that whereas the progress rate of shrinkage under the 300 mW/cm$^2$ of strong UV light is high and the progress rate of shrinkage under the 60 mW/cm$^2$ of weak UV light is low, the curing shrinkage is completed after nearly 30 seconds, essentially irrespective of the UV irradiation strength. Considering from these facts the differences in the progress rate of curing shrinkage according to the particular strength of the UV light, it can been seen that because of direct exposure to the UV beams 102a and 103b, the clearance 220 for the adhesive 100b first begins to cure. In contrast to this, an uncured liquid section exists at the clearance 230 for the adhesive 100b because of slow curing due to exposure to the weak UV light. For this reason, even if UV curing shrinks the clearance 220 in the Z-direction, the liquidity of the adhesive at the clearance 230 with respect to the holder 41 gripped by the positioning chucks 61a and 61b makes fluidity of the uncured section absorb deformation due to the curing shrinkage of the clearance 220. After this, further UV irradiation causes curing shrinkage due to the curing of the uncured clearance 230 for the adhesive 100b, but since the clearance 230 is small in comparison with the clearance 210 between the holder 41 and the optical pickup casing 2, this dimensional difference is found to be effective for reducing UV curing shrinkage of the entire adhesive 100b.

In addition, to absorb curing shrinkage effectively by utilizing the deformation of the liquid section, a clearance 240 between the protrusion 42 of the holder 41 and the adhesive 100b, and a clearance 250 between the protrusion 43 and the adhesive 100b are desirably ensured to avoid contact between the protrusion and the adhesive. This not only renders the clearance 230 of the adhesive 100b shrinkable in the XY directions and reduces the shrinkage in the Z-direction, but also impinges the UV light upon the adhesive present in the clearance 230.

Finally, until the shrinkage has come to essential completion, irradiation with UV light is continued for at least 20 seconds to completely remove the uncured section and ensure bonding reliability. There is no problem, provided that a sufficient cumulative amount of light is thus obtained.

Although protrusions are provided on the bonding surface of the holder 41 in the above embodiment, it goes without saying that providing essentially the same protrusions on the bonding surface 21 of the casing 2 yields essentially the same advantageous effects.

It is desirable that the ultraviolet (UV) curable adhesives 100a and 100b be of an acrylic or epoxy-based UV curable type. To completely cure the section that remains uncured during UV irradiation, a UV curable adhesive of a type combined with thermosetting can be used as a substitute. Alternatively, although bonding strength is relatively prone to decrease, an adhesive with an added thermoconductive filler capable of improving heat conductivity is also usable.

Second Embodiment

Figure 6A:
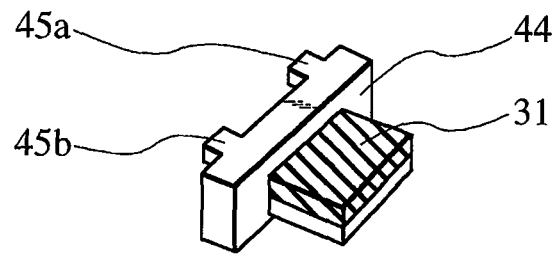
FIGS. 6A to 6C are explanatory diagrams illustrating a major section of a second embodiment of the present invention.
Figure 6B:
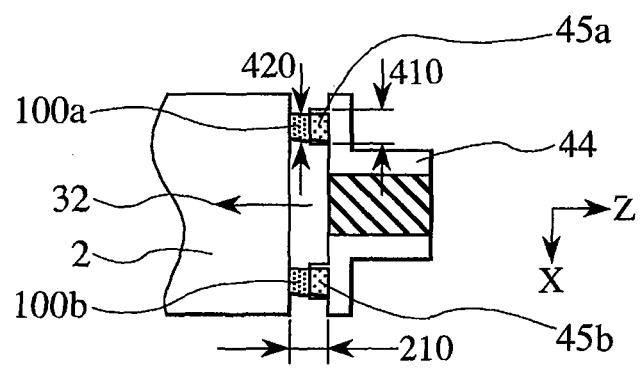
Figure 6C:
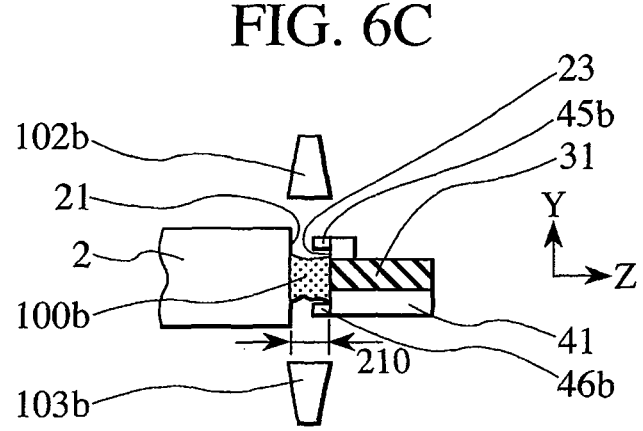

Another embodiment that applies a holder of another shape is next described below. FIG. 6A is a perspective view illustrating a holder 44 of another shape. FIG. 6B is a plan view illustrating an assembly status of a section using the holder 44. FIG. 6C is a side view of the corresponding section. Description of the holder 44 is omitted since portions of the holder 44, except for protrusions 45, are essentially the same as in the first embodiment.

As in the first embodiment, after alignment in XYZ directions, a clearance 210 between the holder 44 and an optical pickup casing 2 is provided, then a predetermined amount of each of UV curable adhesives 100a and 100b is applied to a corresponding portion of a bonding surface 21 of the optical pickup casing 2, and the clearance 210 is returned to its initial state existing before the alignment was completed. The adhesives 100a and 100b provide bridging between the bonding surface 21 of the optical pickup casing 2 and a mating face (bonding surface) of the holder 44. After this, Y-axially downward beams of UV light, 102a and 102b, and Y-axially upward beams of UV light, 103a and 103b, are emitted to cure the adhesives 100a and 100b.

A relationship in coating position between protrusions 45a, 45b, 46a, 46b, and the adhesive, is described below using the plan view of FIG. 6B. To absorb deformation due to curing shrinkage of the adhesive by utilizing fluidity of a section which remains uncured, the protrusions 45a, 45b, 46a, 46b desirably have a width 410 slightly greater than an coating width 420 of the adhesives 100a and 100b, to ensure that the protrusions weaken the UV light emitted to part of the adhesive. Alternatively, in the present invention, a predetermined amount of adhesives 100a and 100b may be applied between the protrusions 45a and 46a and between the protrusions 46a and 46b, by using these protrusions as target positions for coating. Thus, the coating positions and the amount of coating can be controlled more easily.

While the protrusions on the bonding surface of the holder 41 in the present embodiment feature a shape similar to that of Japanese traditional wooden shoes' teeth, with parallel uppermost and lowermost portions only at an adhesive introduced section on the bonding surface, it goes without saying that formation of triangular or cylindrical protrusions, if the protrusions are shaped so as to shroud a neighboring region of an interface with the bonding surface of the adhesive, yields essentially the same advantageous effects.

The LD and the light-receiving element are essential components in that their shifts in position and angle, compared with those of other optical components, are significantly influential upon optical misalignment. Accordingly, the technique in which the clearances between the optical pickup casing and the LD or the light-receiving element are adhesion-fixed via a thick adhesive layer at high positioning accuracy is essential for improving a yield and reliability. Additionally, since specifications relating to the assembly accuracy demanded to respond to sophistication of BD or other disc functions in the optical pickup device and/or to reduction of the pickup device in thickness become stringent, these demands for the functional sophistication and physical thinning of the optical pickup device can also be met using this technique.

What is claimed is:

1. An optical pickup device comprising:
a holder for holding at least one of a laser diode and a light-receiving element; and
a casing of an optical pickup having the holder fixed thereto via an ultraviolet-curable adhesive;
wherein the holder or the casing includes a plurality of protrusions which protrude in a direction of a laser beam emitted from the laser diode and are formed at a peripheral sections of a bonding surface for the holder or the casing, the bonding surface for the holder being opposed to the casing as a counterpart and the bonding surface for the casing being opposed to the holder as a counterpart, and
wherein the ultraviolet-curable adhesive is put in a clearance between the protrusions such that the ultraviolet-curable adhesive does not come into contact with the protrusions and the protrusions partially shield a section of the ultraviolet-curable adhesive.

2. The optical pickup device according to claim 1,
wherein the holder includes the protrusions formed at its peripheral sections, the protrusions being above and below a bonding surface for the holder, the bonding surface being opposed to the casing as a counterpart.

3. The optical pickup device according to claim 1,
wherein the casing includes the protrusions formed at its peripheral sections, the protrusions being above and below a bonding surface for the casing, the bonding surface being opposed to the holder as a counterpart.

4. The optical pickup device according to claim 1,
wherein the protrusions provided on the bonding surface are formed such that one of the protrusions provided at an uppermost portion and one of the protrusions provided at a lowermost portion are parallel to each other on the bonding surface.

5. The optical pickup device according to claim 4,
wherein the protrusions provided on the bonding surface are formed such that one of the protrusions provided at the uppermost portion and one of the protrusions provided at the lowermost portion are parallel to each other only at the adhesive introduced section on the bonding surface.

6. A method for manufacturing an optical pickup device, the manufacturing method comprising:
a holding step in which a holder which includes at least one of a laser diode and a light-receiving element is held such that the holder has a bonding surface thereof opposed to a bonding surface of a casing of an optical pickup, and such that an ultraviolet-curable adhesive is put in a clearance between the bonding surface of the holder and the bonding surface of the casing; and
an ultraviolet curing step in which ultraviolet radiation is emitted from lateral sides of the holder and the casing such that a section upon which the radiation strongly impinges, and a section upon which the radiation weakly impinges will be generated in the ultraviolet-curable adhesive.

7. The manufacturing method according to claim 6, wherein
the holder or the casing includes protrusions at its peripheral sections, the protrusions being above and below a bonding surface for the holder or the casing, and the section upon which the radiation impinges has a part thereof shielded by the protrusions, thereby decreasing in strength of the ultraviolet radiation.

8. The manufacturing method according to claim 7,
wherein the optical pickup device includes a clearance between the ultraviolet-curable adhesive and the protrusions.

9. The manufacturing method according to claim 6,
wherein irradiation with ultraviolet radiation is conducted using an optical fiber or an optical-fiber bundle.

10. A method for manufacturing an optical pickup device, the manufacturing method comprising:
a holding step in which a holder that includes at least one of a laser diode and a light-receiving element, and a plurality of protrusions on a bonding surface, is held such that the holder has a bonding surface thereof opposed to a bonding surface of a casing of an optical pickup, and such that an ultraviolet-curable adhesive is put in a clearance between the bonding surface of the holder and the bonding surface of the casing in such a manner as to prevent the ultraviolet-curable adhesive from coming into contact with the protrusions; and
an ultraviolet curing step in which the ultraviolet-curable adhesive is irradiated with ultraviolet radiation from lateral sides of the holder and the casing, and
in the ultraviolet curing step, part of the ultraviolet radiation emitted to the ultraviolet-curable adhesive is partially shielded by the protrusions.

11. A method for manufacturing an optical pickup device, the manufacturing method comprising:
a step of providing a casing of an optical pickup, a holder for holding at least one of a laser diode and a light-receiving element, the holder being formed to include protrusions at peripheral sections of a surface other than a bonding surface opposed to the casing, and an ultraviolet-curable adhesive put in a clearance between the holder and the casing of the optical pickup;
a first curing step of irradiating the ultraviolet-curable adhesive with ultraviolet radiation with the holder and the casing of the optical pickup held so that the ultraviolet-curable adhesive may be cured; and
a second curing step of curing the section of the ultraviolet-curable adhesive that has been irradiated with reduced ultraviolet radiation by the protrusions in the first curing step.

12. A method for manufacturing an optical pickup device, the manufacturing method comprising:
a step of providing a holder for holding at least one of a laser diode and a light-receiving element, an optical pickup casing including protrusions at peripheral sections of a surface other than a bonding surface opposed to the holder, and an ultraviolet-curable adhesive put in a clearance between the holder and the optical pickup casing;
a first curing step of irradiating the ultraviolet-curable adhesive with ultraviolet radiation so that the ultraviolet-curable adhesive may be cured; and
a second curing step of curing, with the holder and the optical pickup casing held, the section of the ultraviolet-curable adhesive that has been irradiated with reduced ultraviolet radiation by the protrusions in the first curing step.

* * * * *